United States Patent [19]

Haupt et al.

[11] 4,344,320

[45] Aug. 17, 1982

[54] CRACK INDICATOR FOR MONITORING THE INSULATION OF LIQUEFIED GAS TANKS

[75] Inventors: Walter Haupt, Leverkusen; Heinz Warncke, Cologne; Heinz W. Friebe, Ludwigshafen; Dieter Reimold, Heddesheim, all of Fed. Rep. of Germany

[73] Assignees: Bayer Aktiengesellschaft, Leverkusen; Rheinhold & Mahla GmbH, Mannheim, both of Fed. Rep. of Germany

[21] Appl. No.: 139,953

[22] Filed: Apr. 14, 1980

[30] Foreign Application Priority Data

Apr. 27, 1979 [DE] Fed. Rep. of Germany ....... 2917255

[51] Int. Cl.³ .................... G01M 3/22; G01M 3/26
[52] U.S. Cl. .................... 73/40.7; 62/127; 73/49.1; 340/605; 340/626; 138/104
[58] Field of Search .................... 73/40.7, 49.1, 49.2

[56] References Cited

U.S. PATENT DOCUMENTS

| 3,214,963 | 11/1965 | Schlumberger et al. | 73/40.7 X |
|---|---|---|---|
| 3,232,640 | 2/1966 | Donkle, Jr. | 73/40.7 X |
| 3,489,311 | 1/1970 | Folkerts et al. | 73/40.7 X |
| 3,505,855 | 4/1970 | Rolland | 73/23 |
| 3,729,983 | 5/1973 | Coppens | 73/40.7 |
| 3,870,012 | 3/1975 | Metivier | 116/268 X |
| 3,913,341 | 10/1975 | Katsuta | 73/40.7 X |
| 3,942,331 | 3/1976 | Newman, Jr. et al. | 73/40.7 X |
| 3,968,675 | 7/1976 | Briggs | 73/40.7 X |
| 4,027,379 | 6/1977 | Cheng et al. | 62/45 X |
| 4,216,821 | 8/1980 | Robin | 73/40.5 X |
| 4,226,113 | 10/1980 | Pelletier et al. | 73/40.7 |

FOREIGN PATENT DOCUMENTS 2713007  5/1978  Fed. Rep. of Germany ... 73/40.5 R

*Primary Examiner*—Daniel M. Yasich
*Attorney, Agent, or Firm*—Sprung, Horn, Kramer & Woods

[57] ABSTRACT

A crack indicator based on a piping system consisting of cold-embrittling plastics pipes imbedded in a gas container insulation. A warning gas is subjected to an excess pressure in the piping system. In the event of a crack or other damage to the insulating material, a leak is produced in the piping system at this point so that warning gas flows out into the tank interior. In this case, an indicator responding to the issuing warning gas produces an alarm signal. The alarm emitter can consist, for example, of an analysis instrument for the specific gas. However, an indicator based on a pressure measuring system which is connected upstream of the piping system and produces an alarm signal when a predetermined pressure difference is exceeded is simpler.

13 Claims, 7 Drawing Figures

CRACK INDICATOR FOR MONITORING THE INSULATION OF LIQUEFIED GAS TANKS

BACKGROUND OF THE INVENTION

The invention relates to a crack indicator for monitoring the insulation, in particular the internal insulation, of gas reservoirs for low boiling, liquefied gases. Low temperature liquids, for example liquefied gases (down to −162° C.) are stored and transported in insulated steel or concrete containers (liquefied gas tanks). The thermal insulation has to meet high safety requirements as a thermal bridge is produced if the insulating layer is cracked or damaged, and liquefied gas flows out. In addition to the evaporation losses, this can lead to super-cooling of the supporting mountings which are possibly not tough at very low temperatures and would thus be damaged (brittle fracture). In liquefied gas tanks which are designed for transportation by sea, even higher requirements are made on the perfect functioning of the insulation.

For this reason, warning systems have been developed which immediately indicate malfunctioning of the tank (first barrier) and insulation.

The Inter-Governmental Maritime Consultative Organization (IMCO) gas tanker code prescribes, for example, a gas detection system which is based on the fact that when liquefied gas passes through the first barrier (tank), it penetrates the inter-barrier space and can be detected therein using a gas detector. For this purpose, the cavities are flushed with nitrogen or purified exhaust gas. The flushing gas is conveyed through a gas detector which reacts specifically on the filling gas and emits a warning signal if a crack occurs in the insulation.

Another crack indicating system also makes use of the gas detection principle, but is based on a pipe work system imbedded in the insulation. The pipe work system is continuously traversed by a flushing gas and communicates, in a similar manner to the device described above, with a gas detector which reacts to the specific filling gas. As known from experience, since the insulating layer is subjected to a high tensile stress, once a crack has occurred, it self-propagates further and tears or at least damages the pipe work system at this point. The evaporated filling gas can then penetrate through the resultant leak in the pipe work system into the pipe and passes to the gas detector which triggers an alarm in the same manner as described above.

In addition to these devices which are based on the principle of leakage indication, electrical warning systems have become known, which are based on an electrical conductor system imbedded in the insulating layer. In this case, the change in the electrical properties in the event of a crack serve to trigger an alarm. Thus, a crack indicator for the internal insulation of a liquefied gas tank which is based on a network of resistance strain gauges imbedded in the insulating layer is described, for example, in German Offenlegungsschrift No. 2 713 007. A crack in the insulation can then be detected due to the change in the strain condition on the respective resistance strain gauge.

From a technical viewpoint, the warning system has to meet the following requirements:

1. The incorporation of a piping system into the insulating layer should not be accompanied by problems and should also not impair the strength of the insulating layer.
2. The warning system must be easy to assemble, including the associated auxiliary devices.
3. It must be possible to check operation before the first filling of the liquefied gas tank and also at any later moment without the need for large modifications.
4. A crack in the insulation should not only be capable of being indicated but also of being located.
5. In the event of damage, it must be possible to repair the insulating layer, in which process the warning system must be shifted back into its previous condition.

These requirements cannot all be met in the warning systems according to the prior art.

SUMMARY OF THE INVENTION

An object of the invention is to develop a warning system which is improved in this respect.

Starting from a warning system based on leakage indication with the aid of a piping system arranged inside the insulation, this object is achieved according to the invention in the following manner:

(a) The piping system consists of cold-embrittling plastics pipes which are rigidly connected to the insulating material, are imbedded in the insulation and contain a warning gas which is under an excess pressure higher that the maximum pressure of the liquefied gas at the bottom of the container in the case of maximum filling.

(b) The warning gas flowing out into the tank interior in the event of a crack in the piping system is detected by an indicator which triggers an alarm when a predetermined threshold value is exceeded.

In contrast to the known, above-mentioned crack indication systems, the filling gas does not therefore flow into the piping system in the event of damage. Instead, the indicator is designed in such a way that an alarm is triggered when warning gas issues at any point of the piping system under excess pressure. A gas analysis instrument which is specific to the warning gas, for example, a mass spectrometer, which is connected to the highest point of the gas container has proven suitable as an indicator. In this case, helium which is easy to detect by mass spectrometry is preferably used as the warning gas.

In an alternative design, the indicator consists of a throttling member arranged at the inlet of the piping system which a differential pressure gauge connected in parallel, which produces an alarm signal when a predetermined pressure difference is exceeded. To produce a constant warning gas pressure, the piping system is connected via a pressure regulator to the warning gas source.

In order to check passage through the piping system or a single imbedded pipe, another throttle with a flow meter is arranged at the end opposite the feed point, and a small quantity of warning gas is constantly removed and measured with it, the quantity removed being so small that the pressure drop produced at the inlet throttle remains clearly beneath the alarm threshold.

The pneumatic crack indicator described above can also be used for localising the crack if the flow resistance of the throttling member is dimensioned in such a way that it is of the same size as the flow resistance of the piping system and the differential pressure indicator is designed as a measuring device for the pressure drop produced by the leaked gas stream at the throttling member and for the pressure which is reduced round this pressure drop between the throttling member and the piping system. When the gas container is empty, the pressure drop measured is an immediate gauge of the pipe length between the feedpoint and the leakage point at which the warning gas if flowing out so that the leakage point and therefore the crack can in conjunction with the known gemometry of the piping system be located.

Other embodiments of the invention are described hereinafter.

The following advantages are achieved with the invention:

1. In the event of damage, the warning gas issuing causes an alarm or an indication irrespective of whether the container is empty or full and irrespective of the type of filling.
2. Increased reliability of crack indication is achieved, particularly if the detection of the warning gas in the dome of the container and the indication of a flow of warning gas in the piping system are combined with each other.
3. The pneumatic display affords the advantage that the test signal can be used to locate the damage.
4. The new crack indication system is composed of tested conventional commercial components.
5. In contrast with earlier methods, flushing gas is not needed. Warning gas is only consumed to a small extent in the event of damage.
6. The strength of the insulating system is not impaired by the imbedded piping system.
7. The operating capacity of the crack indication system can be checked before it is installed, during installation or in use without large modifications.
8. The assembly of the piping system is relatively simple since the piping system is available as a continuous product and in the case of the frequently employed foam insulation, is simply foamed in.

BRIEF DESCRIPTION OF THE DRAWINGS

The invention is described in more detail below with reference to the embodiments illustrated in the drawings wherein.

DETAILED DESCRIPTION OF THE INVENTION

Figure 1:
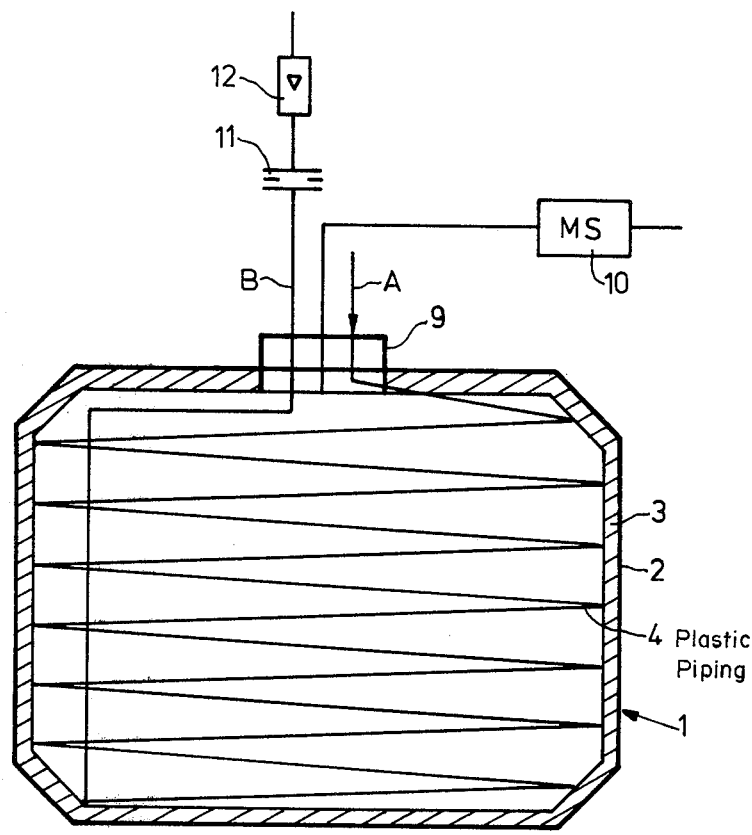
FIG. 1 shows a liquefied gas tank with a schematically indicated imbedded piping system in the insulation and a crack indicator based on gas detection.

A liquefied gas container 1 illustrated in FIG. 1 consists of a steel wall 2 and the internally applied insulation 3. A piping system 4 which runs spirally round the volume of the container is imbedded in insulation 3.

Figure 2:
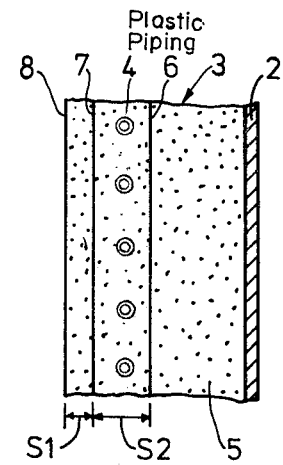
FIG. 2 shows a magnified detail of the insulation with the imbedded piping system.

The insulation system has to meet particularly high requirements in the event of low temperature liquefied gas tanks ($-162°$ C.). FIG. 2 shows an insulation which is suitable for such tanks. It consists of a polyurethane foam layer 5 with glass-fibre mats 6 and 7 foamed in it which is sprayed on to the tank wall 2. As the polyurethane layer consists of closed cell foam, it is impermeable to liquid and almost completely tight to diffusion by most gases, in particular by methane. With a tank of this type, the foam surface 8 and the glassfibre fabric 7 which is located behind it are designated as a first barrier S1 and the subsequent polyurethane (PUR) layer with the glass fibre fabric 6 as a second barrier S2. The piping system 4 is located between the first and second barriers during the foaming process. It consists of thermoplastic tubes which are rigidly connected to the PUR foam by surface cross-linking and become brittle in the cold. The plastics tubes are composed, for example, of PVC and have a diameter of from 1.5 to 5 mm and a wall thickness of from 1 to 0.5 mm.

A high contraction stress, which should be considered a cause of crack formation, is produced in the PUR layer during cooling. As the insulation is damaged at the respective point by a crack, a crack indicator must be provided so that safety measures can be taken immediately in such a case. The crack detector according to the invention is accordingly based on the fact that a warning gas is located in the piping system under excess pressure and a brittle crack takes place in the plastics pipe when a crack occurs at the respective point and this is synonymous with a leakage point in the piping system. The warning gas, for example, helium, flows inwards through this leakage point into the tank and can be detected at a dome 9 (FIG. 1) using a gas detector. A mass spectrometer 10 which is adapted to helium can be used, for example, as gas detector. Rapid-indicating, selective gas analysis instruments such as, for example, nondispersive infra-red analysers can also be used. The liquefied gas in the container 1 is normally at a slight excess pressure (0.2 bar). In order for the warning gas to be able to flow out of the leakage point and rise in the dome 9 in the event of a crack, the piping system must be under an excess pressure which is greater than the sum of the hydrostatic pressure of the liquefied gas in the tank and the above-mentioned excess pressure. In order to achieve indication of a crack even in the most undesirable case, the excess pressure in the piping system should be greater in each case than the maximum pressure of the liquefied gas occuring at the bottom of the container.

Two inlet and outlet connections A, B of the piping system 4 and also of the mass spectrometer 10 are led out through the dome 9. The warning gas (helium) is introduced at A. A blind seal is normally located at B. However, it is possible to check the penetrability of the piping system 4. For this purpose, the blind seal is removed and a throttle 11 with a flow meter 12 is connected instead.

Figure 3:
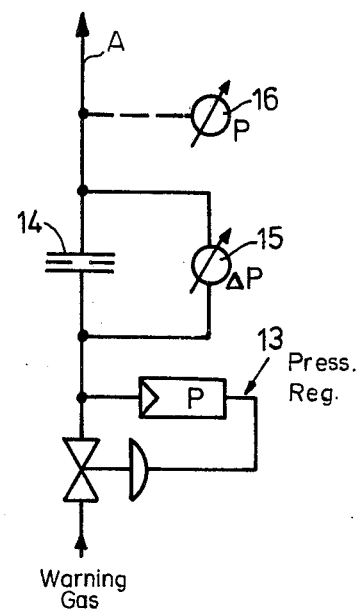
FIGS. 3 to 5 show various embodiments of a pneumatic crack indication with the possibility of locating the damage.

Instead of the gas detector 10 which reacts to the issuing warning gas, the gas flow occurring in the event of a crack in the piping system 4 can also be utilised directly for crack indication. In this case, a series connection as illustrated in FIG. 3 of pressure regulator 13 and throttle 14 with differential pressure indicator 15 is connected to the piping system 4 at A. In accordance with the guidelines given above, the warning gas pressure is adjusted to a value of 0.3 bar by the regulator 13. In normal cases, the piping system is sealed everywhere so that flow losses do not occur. The differential pressure $\Delta P$ at the throttle is then 0. The pressure P in the piping system, which can be indicated separately (16), coincides with the initial pressure set on the regulator 13. As a crack occurs in the insulating layer, which causes breakage of the piping system 4, the warning gas flows out. A pressure difference which triggers an alarm then occurs at the throttle 14. Moreover, the pressure P in the piping system diminishes by the pressure drop ΔP at the throttle 14. The control device connected to outlet B in FIG. 1 (blockages in the piping system) can obviously also be used successfully in combination with the pneumatic crack indicator according to FIGS. 3 to 7. If the throttle 11 is dimensioned in such a way that the quantity of warning gas removed at B remains so small that the pressure drop produced by this stream at the inlet throttle 14 lies clearly below the alarm threshold, the control device can remain connected continuously and does not affect the pneumatic crack indicator. Capillaries or shutters are usually used as throttling members.

The pressure drop ΔP occurring in the event of a crack at the inlet throttle 14 can also be used to locate (localise) the crack in the piping system 4 when the container 1 is empty if the inlet throttle 14 is dimensioned in such a way that its flow resistance is of roughly the same size as the flow resistance of the entire piping system 4. In the event of a crack, the pressure drop produced by the leaked gas stream at the throttle 14 or the pressure P reduced round this pressure drop between the throttle and piping system is in fact a gauge of the pipe length between feed point A and leakage point. The position of the leakage point can be calculated from this length in conjunction with the known geometry of the piping system (spiral according to FIG. 1 or meandering according to FIG. 6). In this way, internal cracks in the insulation 3 which do not appear on the surface 8 of the insulation can also be localised.

Figure 4:
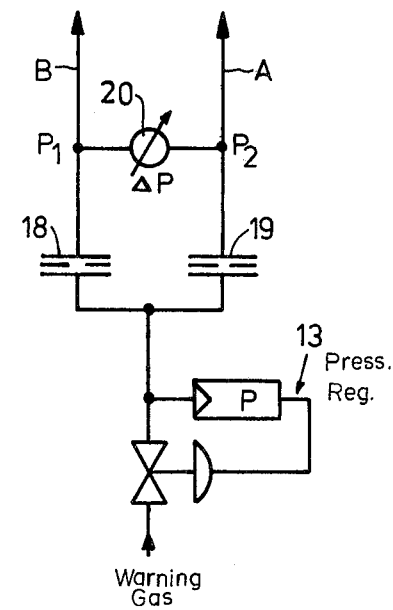

According to FIG. 4, another method of pneumatic crack indication involves providing the piping system 4 at both ends A, B with a common pressure regulator 13 to produce a warning gas initial pressure on throttling members 18, 19 respectively with equal flow resistances. As viewed in the direction of flow, a differential pressure measuring device 20 is connected downstream of these two throttles 18, 19 and indicates the difference in the pressures, each of which are reduced relative to the initial pressure by the pressure drop on the throttling member 18, 19. Due to this circuit, the hydrostatic pressure at the leakage point and the flow resistance of the leakage point are eliminated when a crack occurs. It is possible, even when the container is full, to locate the leakage point unequivocably by means of the known length and position of the piping system 4 as well as with knowledge of the quantitative flow rate of the warning gas flowing into the system.

Figure 5:
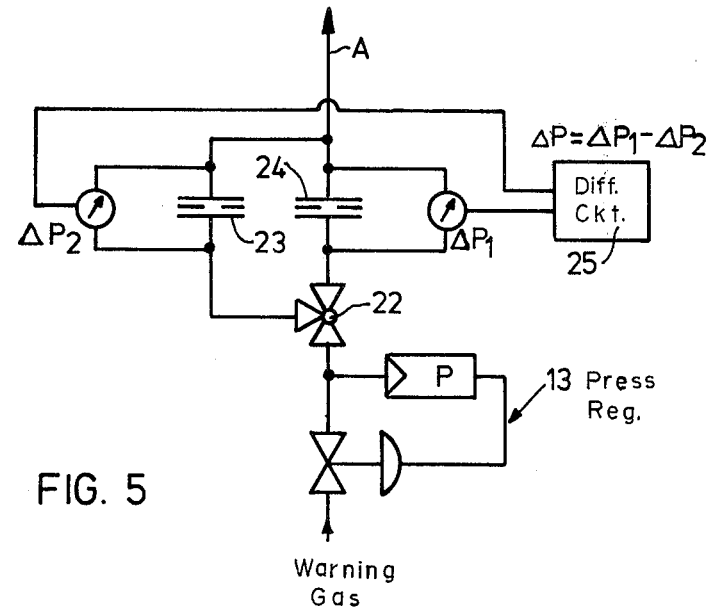

FIG. 5 shows a third alternative for crack indication and location. A pressure regulator 13 is again arranged at the inlet. A three way cock 22 follows the pressure regulator 13 and either clears the path of flow through a first throttling member 23 or through a second throttling member 24. The pressure drops $\Delta P_1$ and $\Delta P_2$ are measured at the two throttling members 23 and 24 and fed to a circuit 25 for forming the differential value ΔP. It is important for the flow resistances of the two throttles 23 and 24 to differ markedly. The hydrostatic pressure at the leakage point are again eliminated by forming the difference ΔP so that the value ΔP is a clear gauge of the length of the pipe from the warning gas feed point A to the leakage point. Information about the height of the leakage point beneath the level of liquid in the container is obtained if the flow resistance of the second throttle 24 is very much greater (for example, by the factor 10) than the flow resistance of the entire subsequent piping system 4. In this case, the pressure measured downstream of the second throttling member 24 is approximately equal to the sum of the hydrostatic pressure at the leakage point and the static pressure above the liquid. The height of the leakage point can be determined from it at a known static pressure and known filling height.

Figure 6:
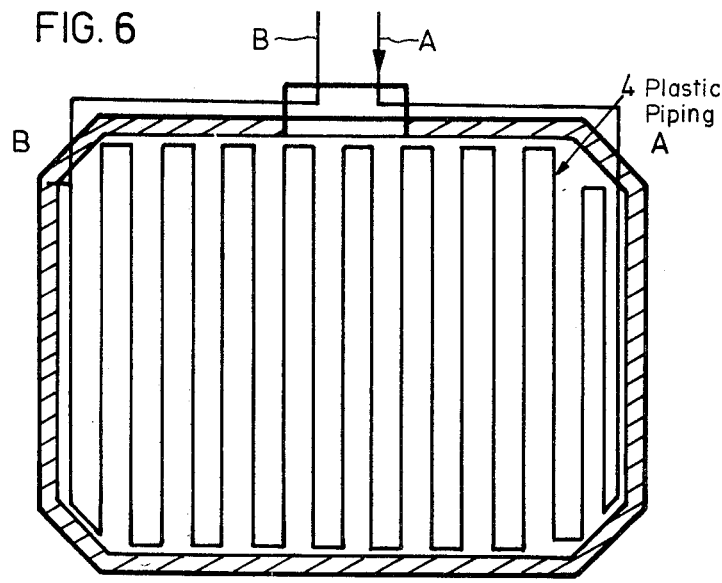
FIG. 6 shows a meandering arrangement of the piping system.
Figure 7:
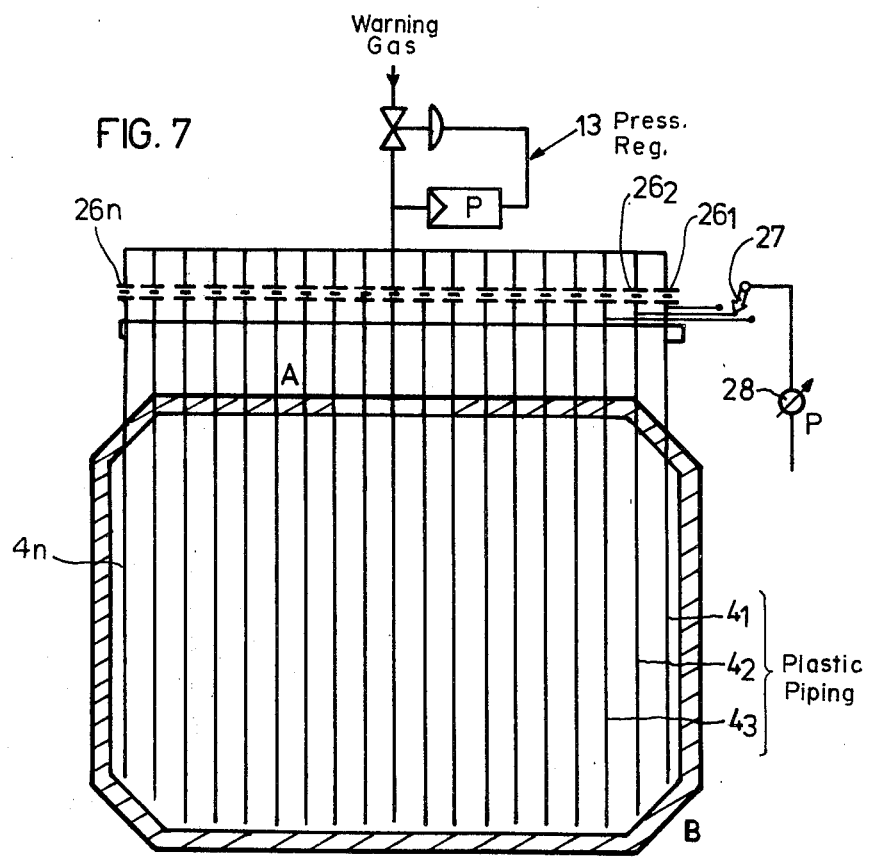
FIG. 7 shows a piping system with a plurality of vertically arranged, individually monitored pipes.

In a fourth embodiment, the circuit according to FIG. 5 is combined with a meandering piping system according to FIG. 6. The flow resistance of the first throttling member 23 is brought into approximate conformity with the flow resistance of the subsequent piping system 4. The differential pressure ΔP which, as already described, is proportional to the pipe length between warning gas feed A and the leakage point, then also produces in addition to the height of the leakage point, its azimuthal position.

The last embodiment (FIG. 7) has the advantage that the crack is particularly simple and mathematically predictable to locate. The piping system consists of a plurality of plastics pipes $4_1$ to $4_n$, which are imbedded at equal intervals along the generating surface of the container in the insulation 3 and which each communicate individually via a separate throttle $26_1$ to $26_n$ with the warning gas source. The plastics pipes $4_1$ to $4_n$ are sealed at the other end (B). As in the arrangements already described, a pressure regulator 13 for producing a constant warning gas pressure is connected upstream of the feed (common connection for the throttles $26_1$ to $26_n$). The throttling members $26_1$ to $26_n$ all have the same flow resistance which has to be substantially greater in this case than the flow resistance of the respective subsequent plastics pipe $4_1$ to $4_n$. A pneumatic measured point converter 27 with a pressure measuring instrument 28 is arranged between the throttles $26_1$ to $26_n$ and the subsequent plastics pipes $4_1$ to $4_n$ and cyclically scans in succession the pressures between the throttles and their subsequent plastics pipes $4_1$ to $4_n$. In the event of damage, the azimuthal position of the leakage point can be determined on the basis of the number of the respectively selected measuring point, whereas the height of the leakage point beneath the level of the liquid is determined by the pressure measured downstream of the respective throttling member, the static excess pressure in the gas tank having to be taken into consideration, as already mentioned. The number of measuring points can be reduced somewhat in this arrangement if groups of adjacent plastics pipes, for example $4_1$, $4_2$, $4_3$, which are each connected via a throttle to a pressure regulator 13, are combined at the inlet into a single pipe. Conversely, the number of plastics pipes can be increased with the same number of measuring points by combining the plastics pipes in groups and their distance from each other can thus be reduced so that a higher indication probability and thus greater reliability in crack indication are obtained. The arrangement according to FIG. 7 has the advantage over the embodiments described hereinbefore that several leakages can be located simultaneously independently of each other.

We claim:

1. In an apparatus for indicating a crack in the internal insulation of a gas container for low boiling, liquefied gases having a piping system within the insulation, the improvement wherein: the piping system consists of cold-embrittled plastic pipes which are embedded in and rigidly connected to the insulating material; means for applying a gas into the piping system which is under an excess pressure greater than the maximum pressure of the liquefied gas at the bottom of the container with maximum filling; and indicator means for producing an electrical alarm signal in response to the excess pressure gas flowing out into the tank interior in the event of a crack in the piping system.

2. The apparatus according to claim 1, wherein the gas container has a highest internal point and the indicator means comprises a gas analysis instrument which is specific to the excess pressure gas and which is connected to the highest internal point of the gas container.

3. The apparatus according to claim 2, wherein the gas analysis instrument is a mass spectrometer and the excess pressure gas consists of helium.

4. The apparatus according to claim 1, wherein the piping system has an inlet and a pressure regulator connected to the piping system for producing a constant excess pressure gas pressure and the indicator means comprises a throttling member at the inlet of the piping system and a differential pressure gauge connected in parallel and which produces the electrical alarm signal when a predetermined pressure difference is exceeded.

5. The apparatus according to claim 4, wherein the excess pressure gas applying means comprises a throttle with a flow meter at the end opposite the inlet to check passage of gas in the piping system.

6. The apparatus according to claim 4 or 5, wherein the flow resistance of the throttling member is of the same order of magnitude as the flow resistance of the piping system and the differential pressure gauge measures the pressure drop produced by a leaked gas stream at the throttling member which is a function of the pipe length between the feed point and leakage point when the container is empty.

7. The apparatus according to claim 4 or 5, wherein the flow resistance of the throttling member is of the same order of magnitude as the flow resistance of the piping system and the differential pressure gauge measures the pressure which is reduced by the pressure drop between throttling member and piping system which is a function of the pipe length between the feed point and leakage point when the container is empty.

8. The apparatus according to claim 4, wherein the excess pressure gas applying means further comprises a second throttling member in parallel therewith and which has a flow resistance which differs from that of the first mentioned throttling member and a changeover device upstream of the two throttling members for selecting one or the other and wherein the indicator means comprises a circuit for forming the diffential value of the pressure drops at the two throttling members so that the hydrostatic pressure at the leakage point and the flow resistance of the leakage point are eliminated whereby the differential pressures at the two different throttling members are an indication of the length of the pipe from the excess pressure gas inlet point to the leakage point.

9. The apparatus according to claim 8, wherein the flow resistance of the second throttling member is much greater than the flow resistance of the entire subsequent piping system so that the pressure measured downstream of the second throttling member indicates approximately the sum of the hydrostatic pressure at the leakage point and the static pressure above the liquid and thus the height of the leakage point beneath the level of the liquid in the container.

10. The apparatus according to claim 8, wherein the flow resistance of the first throttling member is of the same order of magnitude as that of the piping system and the piping system consists of vertically arranged meanderingly connected pipe pieces so that the pipe length resulting from the difference in the pressures downstream of the two throttling members from the excess pressure gas feed to the leakage point indicates the aximuthal position of the leakage point.

11. The apparatus according to claim 1, wherein the piping system has two ends and the means applying the excess pressure gas comprises a common pressure regulator connected to both ends of the piping system for producing an initial gas pressure, two throttling members of equal flow resistance connected between the regulator and the two ends and wherein the indicator means comprises a differential pressure measuring device connected downstream of the two throttling members as viewed in the direction of flow for indicating the difference in the pressures, whereby each of which are reduced by the pressure drop at the throttling member in relation to the initial pressure, so that the hydrostatic pressure at the leakage point and the flow resistance at the leakage point are eliminated so the leakage point can be located by means of the known length and position of the piping system as well as the quantitative flow of the excess pressure gas even when the container is full.

12. The apparatus according to claim 1, wherein the piping system comprises a relatively large number of individual vertically arranged plastic pipes embedded at close intervals over the entire insulating face of the container and wherein the means for applying the excess pressure gas comprises means for applying the same gas pressure to all the pipes comprising a pressure regulator and a plurality of throttling members, wherein all of the throttling members have approximately the same flow resistance and this flow resistance is substantially greater than the flow resistance of the respective following plastic pipes and wherein the indicator means comprises a pneumatic measured point commutator for continuously and cyclically scanning the pressures between the throttling members and their following plastic pipes or the pressure differences at the throttling members so that, on the basis of the respective pipe line selected by the measured point commutator the azimuthal position of the leakage point is identified and the height of the leakage point beneath the level of liquid is determined by the pressure differences measured at the throttling members or by the pressures measured downstream of the throttling members, taking into consideration the static pressure above the liquid.

13. The apparatus according to claim 12, wherein adjacent plastics pipes are combined into groups which are each allocated to a measuring point.

* * * * *